(12) United States Patent
Sato et al.

(10) Patent No.: US 6,332,658 B1
(45) Date of Patent: Dec. 25, 2001

(54) LOCK DEVICE FOR EXPANSION UNIT IN COMPUTER

(75) Inventors: Masahiko Sato; Masuo Ohnishi, both of Kawasaki (JP)

(73) Assignee: Fujitsu, Limited, Kawasaki (JP)

( * ) Notice: Subject to any disclaimer, the term of this patent is extended or adjusted under 35 U.S.C. 154(b) by 0 days.

(21) Appl. No.: 09/513,141

(22) Filed: Feb. 25, 2000

(30) Foreign Application Priority Data

Aug. 31, 1999 (JP) .................................................. 11-244987

(51) Int. Cl.⁷ ....................................................... H05K 7/18
(52) U.S. Cl. ........................................ 312/223.2; 361/726
(58) Field of Search ............................... 312/223.1, 223.2, 312/319.1, 333, 332.1; 361/726, 727, 732, 740, 759, 801, 684; 429/97, 96; 439/157, 159, 160, 928.1

(56) References Cited

U.S. PATENT DOCUMENTS

| 4,914,552 | * | 4/1990 | Keemer . | |
|---|---|---|---|---|
| 5,222,897 | * | 6/1993 | Collins et al. | 439/157 |
| 5,721,669 | * | 2/1998 | Becker et al. | 361/727 X |
| 5,730,610 | * | 3/1998 | Hsia et al. | 439/160 |
| 5,805,420 | * | 9/1998 | Burke | 361/727 |

FOREIGN PATENT DOCUMENTS

| 9-81269 | 3/1997 | (JP) . |
|---|---|---|
| 9-231735 | 9/1997 | (JP) . |
| 9-282048 | 10/1997 | (JP) . |

* cited by examiner

Primary Examiner—Janet M. Wilkens
(74) Attorney, Agent, or Firm—Armstrong, Westerman, Hattori, McLeland & Naughton, LLP

(57) ABSTRACT

A lock device is provided that easily enables attachment and detachment of an expansion unit to and from a computer body such as of a notebook personal computer. The lock device includes a pivotal piece near an expansion-unit insertion slot in the computer body, a first element that extends along a moving direction of the expansion unit, which moves in an extending direction by the pivoting action of the pivotal piece, and includes a press portion that presses the expansion unit when the expansion unit is to be released, and a second element engageable with an engagement portion of the expansion unit, the second element being disengageable from the engagement portion when the first element moves.

11 Claims, 12 Drawing Sheets

LOCK DEVICE FOR EXPANSION UNIT IN COMPUTER

BACKGROUND OF THE INVENTION

The present invention relates to lock devices that may lock and unlock an expansion unit which has been loaded into computers body. The expansion units are detachably connectable to such a computer as a notebook personal computer ("PC") to realize a predetermined function.

Portable electronic information terminals, such as notebook PCs, have been required to reduce its size and weight, while demanded to have more functions. The notebook PCs are designed to include a system achieving its functions in an A4-sized, B5-sized, or other portable-sized housing and can, as necessary, be detachably mounted with an expansion unit for changing and extending its capabilities. The expansion units have various structures in accordance with its functions to be added, as seen in a CD-ROM disk drive, a 3.5-inch floppy disk drive, a power supply, an image pick-up device camera unit, a PC card slot, a printer, a scanner, and a network device, etc.

The various expansion units like these are packaged in a housing of a usually common size, and an expansion unit having a necessary function is configured to be attachable to the computer body by inserting it from the housing into the computer body through the side or bottom of the keyboard. Any other necessary function becomes available in the computer by substituting the currently used unit with another one. Many of the expansion units have such a structure as to constitute part of a computer housing when they are loaded into the housing. A lock mechanism is usually provided in the computer housing to lock the expansion unit that has been attached to the housing and to prevent the unit from easily falling off.

FIG. 12 exemplifies a conventional lock device for an expansion unit in a computer. As shown in FIG. 12, the expansion unit 201 works, for example, as a 3.5-inch floppy disk drive into which a 3.5-inch floppy disk may be inserted. The expansion unit 201, which has an approximately rectangular parallelepiped housing, is detachably connectable by sliding it from the side of the computer body. A rear surface 205 of the expansion unit 201 is provided with a connector that is connectable with a connector 206 provided in the computer body. A locking part 203 provided at the bottom portion 200 in the computer body is engageable with a lock groove 204 in the expansion unit 201 where the expansion unit 201 is loaded and the connectors are connected with each other at the rear surface 205. The locking part 203 is a horizontally slidable member, and engageable with the lock groove 204 by a force of a spring at the locking part 203. This engagement fixes the horizontal slides of the expansion unit 201.

This lock device initially moves the locking part 203 against the spring force, when the expansion unit is removed and another expansion unit, e.g., a CD-ROM disk drive is to be attached, and then releases the engagement between the locking part 203 and the lock groove 204, making the expansion unit 201 horizontally slidable, whereby the expansion unit 201 is pushed out in a lateral direction of the computer body and detached from the computer body. A different function of another expansion unit having the same shaped housing is available when the expansion unit is attached to the computer.

This conventional lock device for an expansion unit in a computer requires, when the expansion unit 201 is to be detached, a computer body to be turned upside down so that its bottom may be turned upward or sideward, before releasing the engagement between the locking part 203 and the lock groove 204. Then the locking part 203 is manually manipulated to unlock the expansion unit 201, and the expansion unit 201 is finally detached by sliding the expansion unit 201 along the bottom surface 200.

If the computer body is connected with a cable to a printer, a telephone line to a modem, or the like, or if a child, a handicapped or the like uses the computer, it is not so easy, however to turn the computer body itself upside down or keep it tilted. For example, suppose the computer is tilted to space the bottom from the desk instead of being turned upside down. The expansion unit 201 is manually slid while the manipulation of the locking part is simultaneously required. This inevitable bothhanded manipulation would cause the computer body to drop and get damaged, or too much force applied to the cable or the connector would cause trouble over a signal transmission.

BRIEF SUMMARY OF THE INVENTION

Therefore, in view of the foregoing technical issues, it is an exemplified object of the present invention to provide a novel and useful lock device that allows an expansion unit to be easily attached to and detached from such a computer body as a notebook PC, in which the above disadvantages are eliminated.

In order to achieve the above objects, a lock device for an expansion unit in a computer the expansion unit being detachably attached to a computer body, the lock device serving to fix the expansion unit that realizes a predetermined extended capability when the expansion unit is connected to the computer body, comprises a pivotal piece near an expansion unit insertion slot in the computer body, a first element which extends along a moving direction of the expansion unit, moves in the extending direction by a pivoting action of the pivotal piece, and includes a press portion that presses the expansion unit when the expansion unit is to be released and a second element engageable with an engagement portion of the expansion unit, the second element being disengageable from the engagement portion when said first element moves.

According to this configuration, a pivoting action of the pivotal piece moves the first element toward its extending direction. In accordance with this movement of the first element, the press portion that presses the expansion unit when the expansion unit is released presses the expansion unit from its rear surface toward an expansion-unit removing direction, and with this action of the press portion, simultaneously the second element is disengaged from the engagement portion of the expansion unit when the first element is moved; therefore unlocking and detaching the expansion unit are simultaneously carried out by one operation of pivoting the pivotal piece. Accordingly, using the inventive lock device makes it possible to easily exchange the expansion unit.

Further, the inventive method of removing from a computer an expansion unit that has been detachably attached to a computer body, the expansion unit capable of realizing a predetermined extended capability when the expansion unit is connected with the computer body, the method comprising the steps of moving in a moving direction of the expansion unit, by pivoting a pivotal piece, a first element that extends along the moving direction, pressing the expansion unit using a press portion provided on the first element, and disengaging an engagement member provided on the first element from an engagement portion of the expansion unit, and making the expansion unit detachable from the computer body.

According to this method, simultaneously with a pressing action at the rear surface of the expansion unit, the engagement member and the engagement portion are disengaged in accordance with the first element's movement; therefore unlocking and detaching the expansion unit are simultaneously carried out by one operation of pivoting the pivotal piece. Accordingly, using the inventive method of removing the expansion unit makes it possible to easily exchange the expansion unit.

Other objects and further features of the present invention will become readily apparent from the following description of the embodiments with reference to accompanying drawings.

DETAILED DESCRIPTION OF INVENTION

A description will now be given of a lock device of a preferred embodiment according to the present invention, with reference to the drawings. This embodiment exemplifies the lock device mounted in a notebook PC, and a description will now be given of the notebook PC 1 and an expansion unit 2 with reference to FIGS. 1–3.

Figure 1:
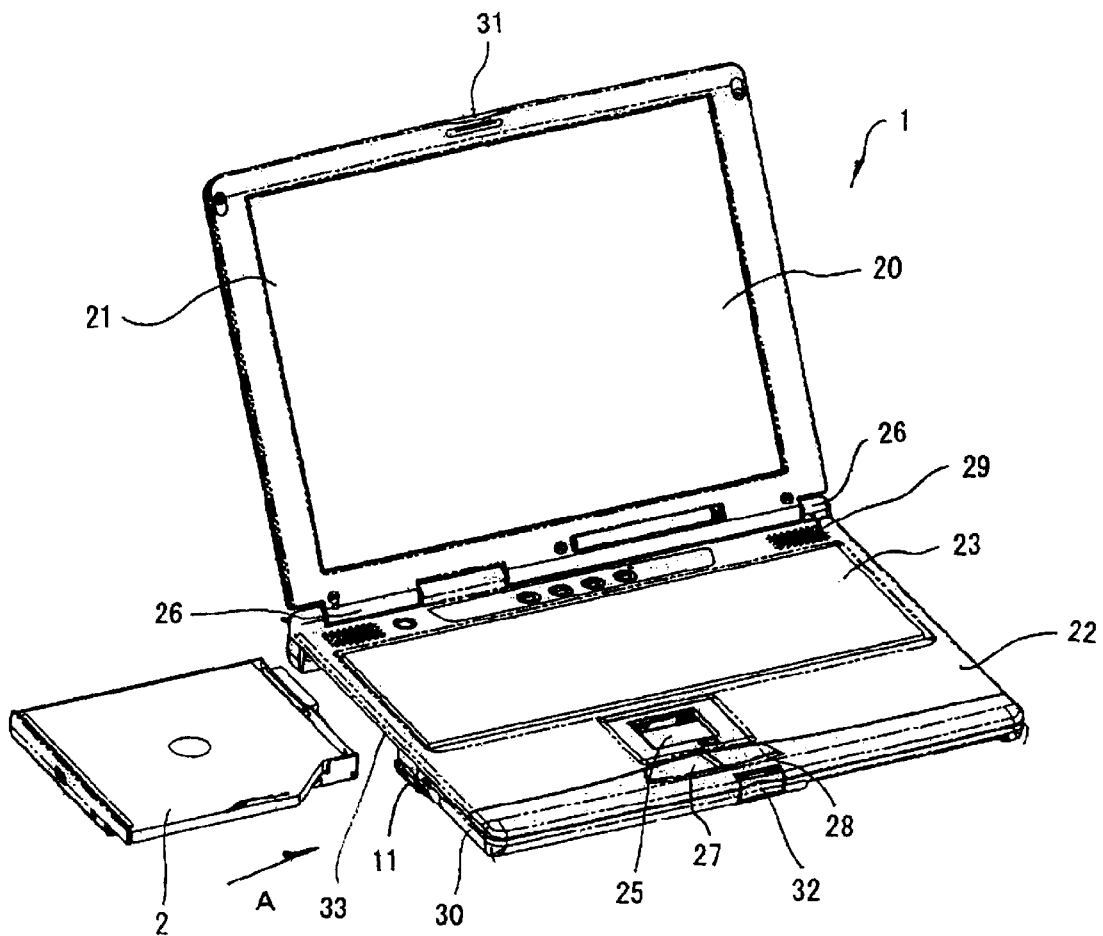
FIG. 1 is a perspective view of an exemplified notebook PC and expansion unit attached to the PC to which a lock device of one embodiment according to the present invention is applicable.

In FIG. 1 a computer 1 is a notebook PC that is configured to open and close via hinge mechanisms 26, 26. The computer 1 includes a display body 20 at one side that has a liquid crystal display 21, and a keyboard body 22 at the other side that has a keyboard section 23. The display body 20 and keyboard body 22 have an approximately rectangular parallelepiped housing that may be bent via the hinge mechanisms 26, 26. They close completely for portability purposes by engaging, a latch mechanism 31 on the display side with a latch mechanism 32 on the keyboard side.

The keyboard section 23 is provided with a plurality of keys although its detailed illustration is omitted. There are various keyboard types applicable Such as the JIS key arrangement the QWERTY key arrangement, the 101-keyboard, or 109-keyboard arrangement, and any other keyboard arrangement. The keyboard may include all or any of Japanese-character keys (Kana keys), alphabet keys, and numeric keys.

The keyboard body 22 which has a keyboard section 23 includes a palm rest part in front of the keyboard section 293, a touch pad part 25 at a position a little to the left of the midsection of the palm rest part, and a pair of buttons or a left button 27 and a right button 28 in front of the touch pad part 25. Without an external mouse connected, the computer is controllable by operating the touch pad part 25 and the buttons 27, 28. A pair of speakers 29, 29 that give sounds are placed, as necessary, at corners on the keyboard body 22 between the keyboard section 23 and hinge mechanisms 26.

At a left-hand side portion 30 of the notebook PC having the above configuration, an insertion slot 33 for accommodating an expansion unit 2 is provided around the keyboard section 23, and the expansion unit 2 may be inserted into the computer 1 in a direction A in the drawing through the insertion slot 33.

The accommodation space in the notebook PC for the expansion unit 2 as indicated by the insertion slot 33 is called an expansion bay, multi-purpose bay, multi-bay. etc. In particular, some portable information processors (e.g., portable PCs, notebook computers or portable electronic equipment) may include the bay that allows a variety of expansion units (such as an FDD, DD, CD)-ROM drive and other peripheral equipment) to be inserted. This bay is configured to allow a user to insert (detachably attach) one of expansion units selected from a plurality of the expansion units. A user has a plurality of expansion units beforehand, and uses them by inserting/ejecting, one of the expansion units, as necessary. For instance, a user who wishes to use an FDD would insert an HDD into the bay and make a floppy disk available. The user, when wishing to use a CD-ROM, would then pull out the FDD, insert a CD-ROM drive into the bay, and make a CD-ROM available. The bay for the portable information processor, etc. is quite different in that a user may freely attach and detach the expansion unit, than a bay or slot for a desktop information processor. The desktop information processor may also have a so-called bay, but the peripheral equipment is undetachably screwed when mounted into the bay. The bay for the portable information processor, etc. supplements a small volume or area for mounting, a unit or an apparatus. For instance, the portable information processor might include both an FDD and CD-ROM drive, but this requires a large area for both units and makes bulk the portable information processor. In other words, the more peripheral units a user wishes to have, the larger the device would be. This would hinder a size reduction to the portable information processor. Accordingly the device is, as described above, configured to accept one expansion unit selected from a plurality of units for one bay while maintaining user's easy detachable operation. Such a bay is used for various types of notebook computers, portable information processors. portable PCs, or portable electronic equipment. Some devices have a plurality of bays. The attachable expansion units may include not only an FDD and a CD-ROM drive but also a DVD drive and a battery, etc. The bay may be designated as various terms such as expansion bay, expansion bay slot, and multipurpose bay.

Figure 2:
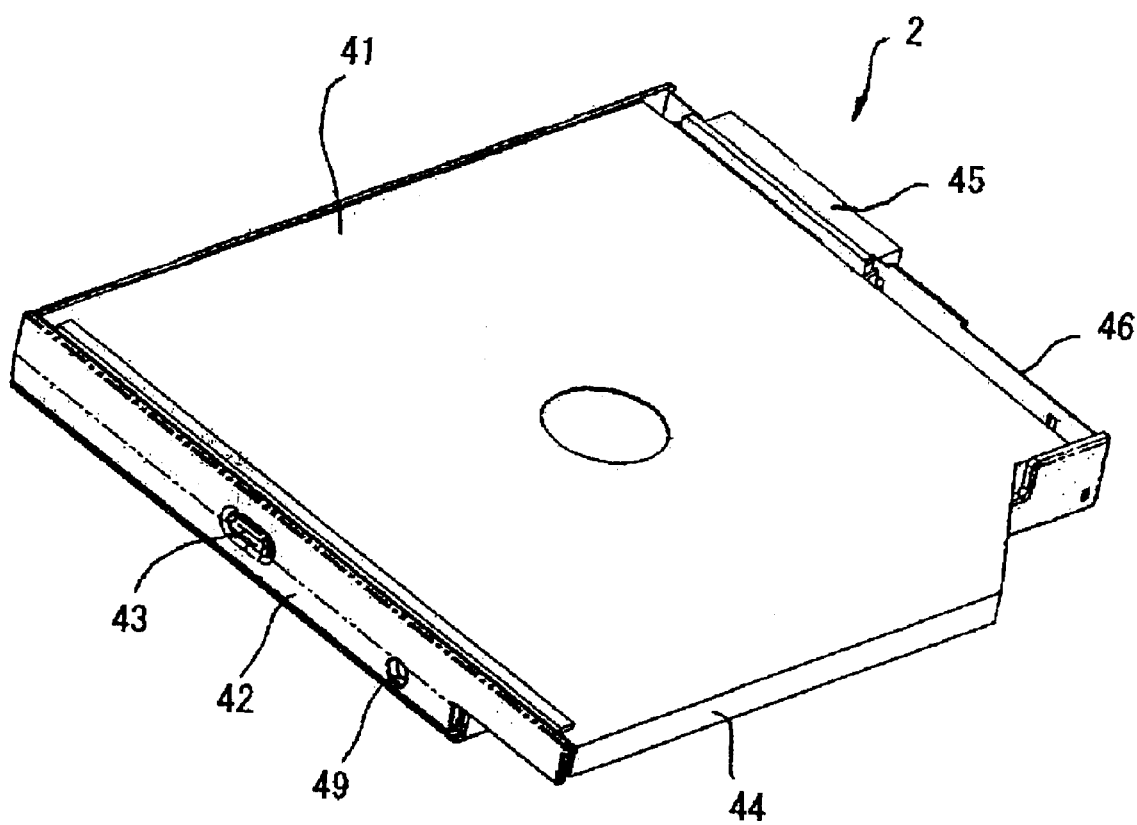
FIG. 2 is a perspective view of the expansion unit viewed from its top.
Figure 3:
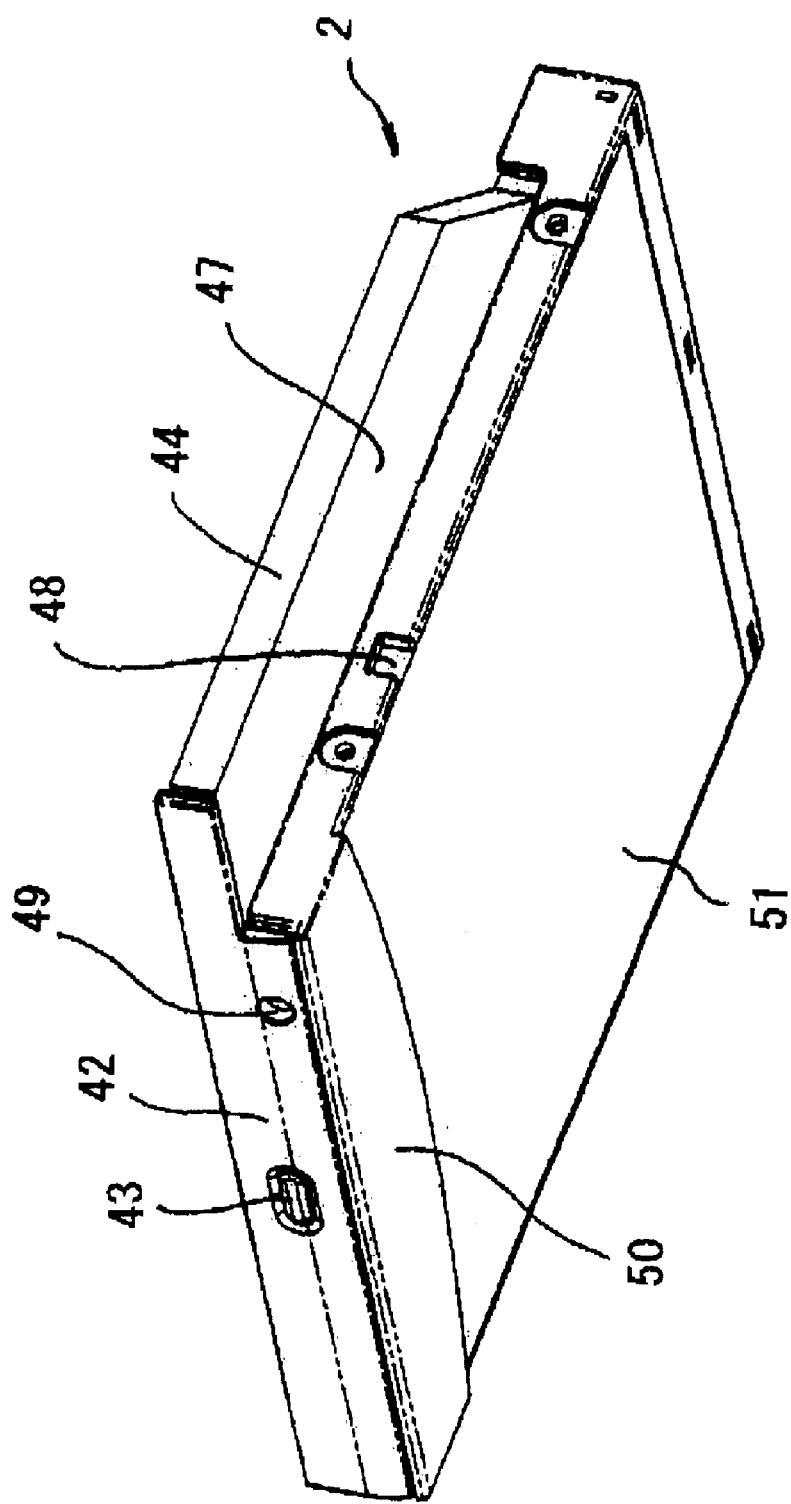
FIG. 3 is a perspective view of the expansion unit viewed from its bottom.

FIGS. 2 and 3 both are perspective views of the expansion unit 2 that is a CD-ROM disk drive. Provided on a front side of the expansion unit 2 is a face panel 42, which is integrated with a side portion 30 of the computer 1 to form one side surface when the expansion unit 2 is attached to the computer 1. A button 43 that is pressed to pull out a tray (not shown) for inserting and ejecting a disk is provided about the midsection of the face panel 42. A hole 49 for forced ejection is provided diagonally below the button 43 to eject an internal medium when no power is applied, and is designed to allow the tray to pop out by inserting a sharp-pointed projection (e.g., a ball-point pen) into the hole 49. The expansion unit 2 has an approximately rectangular parallel-epiped housing and includes a top surface 41 that is made broader than a bottom surface 51, projecting only an approximately upper portion at one sidewall around a thin portion 44. Considering the size of a CD (compact disc), the upper part of the housing may accommodate the CD tray while a lower part of the housing no CD tray to minimize the space. As shown in FIG. 3, the thin portion 44 includes a middle surface 47 parallel to the top and bottom surfaces 41, 51 in the expansion unit 2, and a lock groove 48 below the middle surface 47 on a sidewall of the expansion unit 2. The lock groove 48 is used to prevent the expansion unit 2 from dropping off.

A rear surface of the thin portion 44 is cut away oblique to a moving direction of the expansion unit 2 to correspond to the disc shapes of CDs and CD-ROMs without uselessly occupying) a surrounding space of the expansion unit 2. The expansion unit 2 includes a connector 45 at its rear surface 46 that provides an electric connection with the computer body as a result of a connection with a connector in the computer when the expansion unit 2 is inserted into the computer. The connector 45 supplies the expansion unit 2 with power and enables it to achieve desired functions. Further, the expansion unit 2 includes an apron portion 50 at the bottom surface 51 and at the side of the face panel 42. The apron portion 50 forms a Continuous surface with the bottom surface of the computer 1 when the expansion unit 2 is attached to the computer 1.

Figure 4:
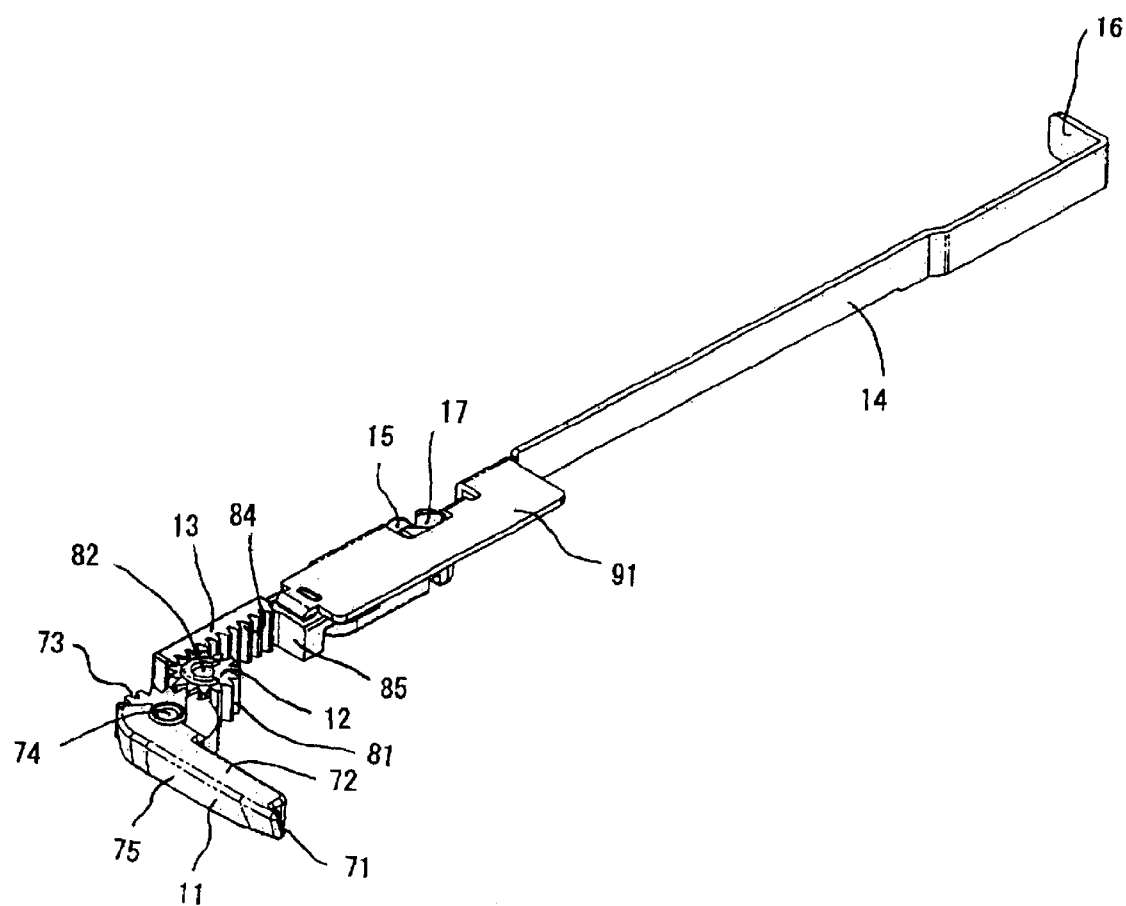
FIG. 4 is a perspective view of a principal portion of the lock device viewed from its top of one embodiment according to the present invention.
Figure 5:
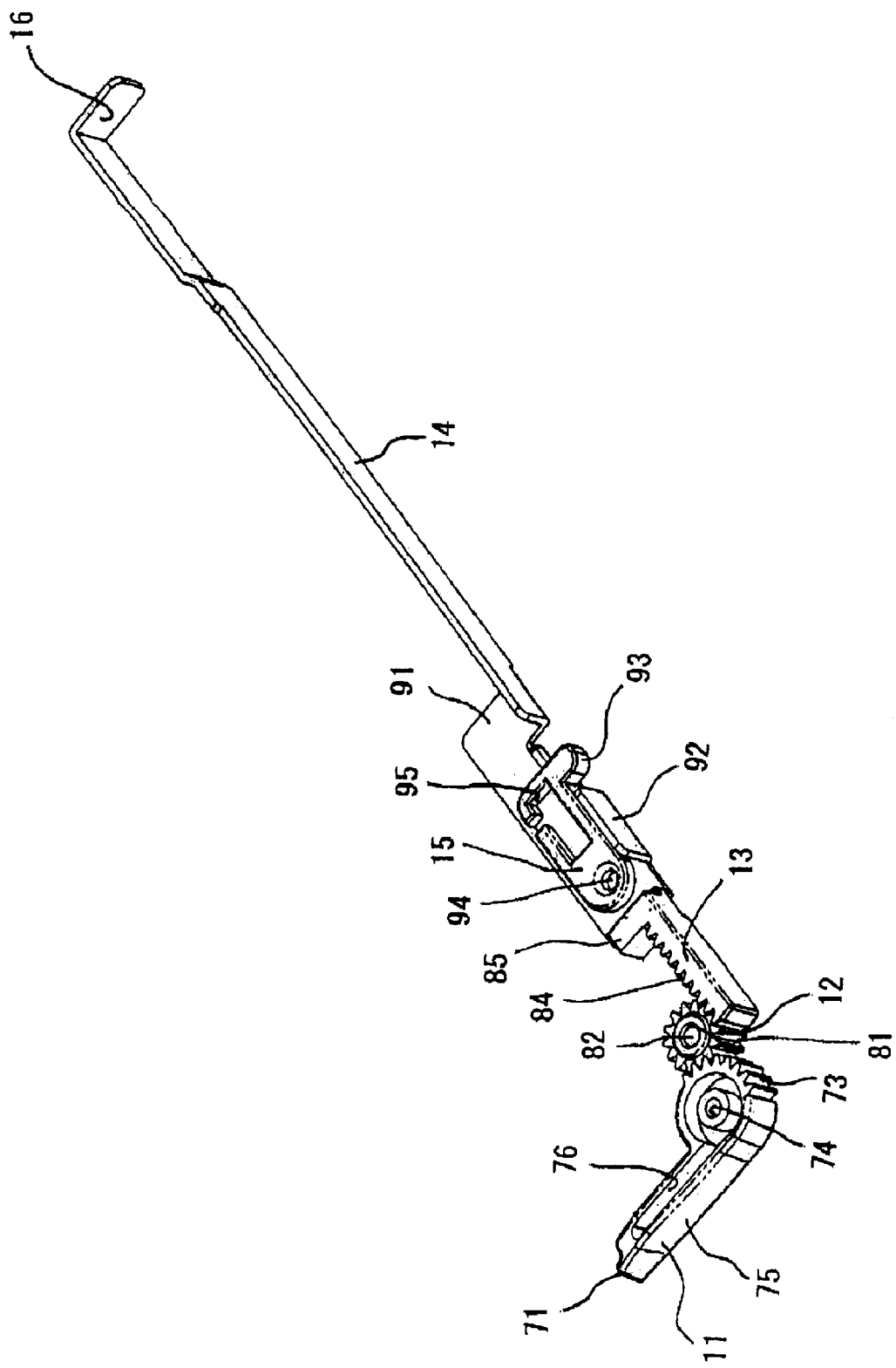
FIG. 5 is a perspective view of a principal portion of the lock device viewed from its bottom of one embodiment according to the present invention.
Figure 6:
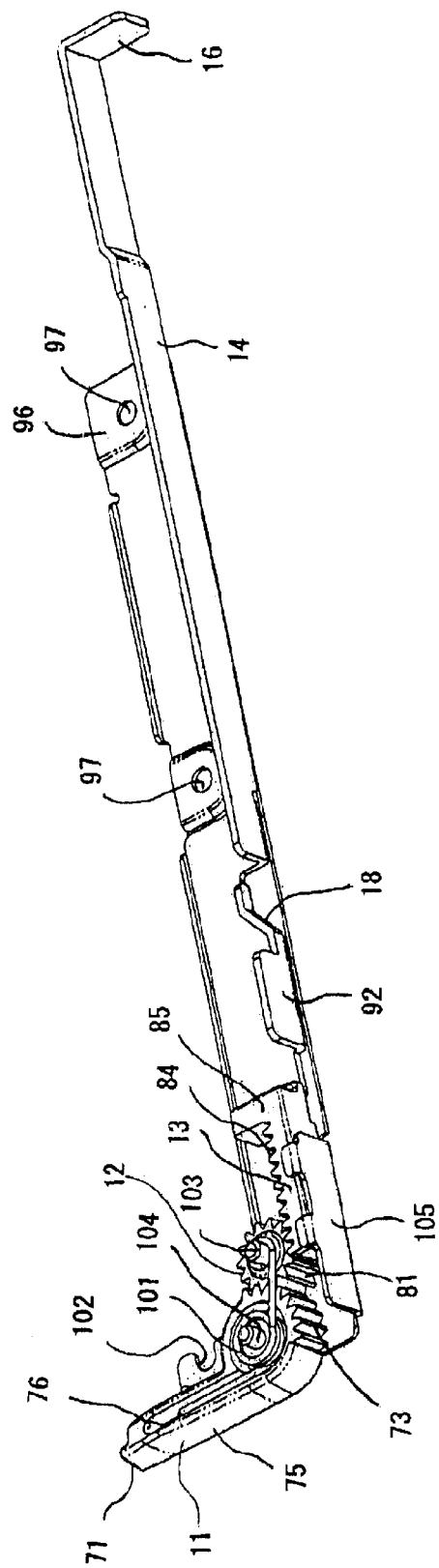
FIG. 6 is a perspective view of a principal portion of the lock device without an engagement member viewed from its bottom of one embodiment according to the present invention.

Next, a description will be given of a lock device that may lock and unlock the expansion unit 2, with reference to FIGS. 4 through 6. The lock device includes, as main constituents, a pivotal piece 11, a pinion gear 12 that engages the pivotal piece 11, a frame member 14 which includes a rack gear portion 13 at its one end and a press portion 16 that may press the expansion unit 2 at the other end, and an engagement portion 15 that freely projects and retracts depending upon a position of the frame member 14.

The pivotal piece 11 has a pivotal hole 74 through, which a rotary shaft 104 passes, and a gear portion 73 around the pivotal hole 74. The gear portion 73 includes grooves parallel to the axial direction of the pivot hole 74. This gear portion 73 may have teeth in an angled range, which is around 90° in the present embodiment, to correspond to the maximum rotary angle and a margin of the pivotal piece 11. An arm portion 75 that provides pivotal actions is formed opposite to the gear portion 73 with respect to the pivotal hole 74. The arm portion 75 extends from the cylindrical surface having the gear portion 73 in the tangent direction, and its outer surface forms one common surface with the side surface 30 of the computer 1 when the arm portion 75 retracts into a pivotal-piece storage portion that will be described later. The pivotal piece 11 includes tab 71 that is made by extending the top and outer side of the arm portion 75 in order to allow a user to pick up and pull out the pivotal piece 11 with his fingertip or fingernail. The pivotal piece 11 includes a groove 76 at the rear surface of the arm portion 75 along the longitudinal direction of the arm portion 75, extending to a circumference of the pivotal hole 74. The groove 76 is a slit for housing and engaging a coil spring 101 as shown in FIG. 6. One end of the coil spring 101 is engaged with the groove 76 in the arm portion 75. The pivotal piece 11 pivotally operates around the rotary shaft 104 that is located near the expansion-unit insertion slot 33 in the computer body.

The pinion gear 12 is supported rotatably about the shaft 103. The pinion gear 12 includes a gear portion 81 that is engageable with a gear portion 73 of the pivotal piece 11, and the rack gear portion 13 that will be described below. The gear portion 81 has grooves parallel to the axial direction of the shaft 103. The pinion gear 12 and the pivotal piece 11 are engaged while their axes are parallel to each other: when the pivotal piece 11 pivots clockwise for unlocking, the pinion gear 12 rotates counterclockwise. The shaft 103 of the pinion gear 12 engages the other end of the coil springy 101, which winds around the rotary shaft 104 of the pivotal piece 11. When the pivotal piece 11 pivotally operates against the elastic force of the coil spring, 101, the coil spring 101 serves to return the pivotal piece 11 to its original position.

The rack gear portion 13 engaging the pinion gear 12 is a straight member, including a gear portion 84 having perpendicular grooves that are engageable with the gear portion 84 of the pinion gear 12. The longitudinal direction of the rack gear portion 1l3 is a moving, direction of the expansion unit 2 for the attachment and detachment of the expansion unit 2. The pivotal piece 11, the pinion gear 12, and the rack gear portion 13 form an L-shape, while the pivotal piece 11 and the pinion gear 12 exist outward in an extended longitudinal direction of the rack gear portion 13. This arrangement enables the rack gear portion 13 to move without contacting the pivotal piece 11 and pinion gear 12. A gear range in the rack gear portion 13 is approximately the same as the length of the gear portion 73 around a curved surface of the pivotal piece 11. A block-shaped connecting portion 85 is provided at one end of the rack gear portion 13, and a portion bent from the top plate member 91 of the frame member 14 engages the rack gear portion 13 at the top surface of the connecting portion 85, whereby the rack gear portion 13 and the frame member 14 are integrated.

The frame member 14, which is a belt-shaped member made of metal or synthetic resin, etc., extends, similar to the rack gear portion 13, along the moving, direction of the expansion unit 2 for its attachment and detachment. The frame member 14 integrally includes the rack gear portion 13 at one end near the side of the computer, and a press portion 16 at the other end in the computer. The press portion 16 is a member that presses the mounted expansion unit 2 through the rear surface 46 when the expansion unit 2 is to be removed. The press portion 16 is formed by bending the end of the belt-shaped frame member 14 towards the expansion unit 2 at about right angle, and has a sufficient length to press the real surface corner of the expansion unit 2 at the side of the frame member 14. Since these rack gear portion 13 and press portion 16 are integrated with the frame member 14, an action to move the rack gear portion 13 would move the frame member 14 and the press portion 16 at the same time. The frame member 14 is, as shown in FIG. 6, supported movably in contact with and along the bottom surface of a support plate 96. The rack gear portion 13 integrated with the frame member 14 is also supported movably in contact with a retainer 105. The combination of these retainer 105 and support plate 96 enables the frame member 14 and integrated rack gear portion 13 to move only along the moving direction of the expansion unit 2. The support plate 96 has a pair of attachment holes 97 as concaves viewed from the top. These attachment holes 97 as the concaves in the support plate 96 may prevent any screw head when used from projecting over the top of the support plate 96, realizing a close arrangement with the thin portion 44 of the expansion unit 2 and thereby a great contribution to a size reduction of the entire computer.

The frame member 14 includes an engagement member 15 at the bottom surface of a top plate member 91. The engagement member 15 is engageable with the lock groove 48 in the side surface of the expansion unit 2 in locking the expansion unit 2. The engagement member 15 is a flat-plate rotary piece, and includes an engagement projection 93 that is engageable with the lock groove 48 in the side surface of the expansion unit 2. The engagement projection 93 has the same thickness as the engagement member 15, and a tapered edge to correspond to the lock groove 48. The engagement member 15 is approximately rectangular at the proximal end of the engagement projection 93, and partially includes a notch portion 95 extending outward from the engagement member 15 at the opposite side of the engagement projection 93. The manner of engagement between the engagement member 15 and the lock groove 48 depends upon materials for the engagement member 15. When it is formed of synthetic resin, the engagement projection 93 is engageable with the lock groove 48 in the expansion unit 2 using the elasticity of the synthetic resin.

The engagement member 15 includes an axial hole 94 at its end near the rack gear portion 13, and becomes pivotally supported by pivotally inserting a spindle (not shown) into the axial hole 94. The spindle engaging the axial hole 94 in the engagement member 15 is fixed on the computer body rather than on the frame member 14. As will be explained later, this is to retreat the engagement projection 93 of the engagement member 15 from the lock groove 48 as the frame member 14 moves. The engagement projection 93 retreats from the lock groove 48 in the expansion unit 2 after the engagement member 15 pivots around the spindle (not shown) in the axial hole 94 on the rear surface of the top plate member 91.

An association between an oblique portion 17 and a contact surface 18 controls the pivotal action of the engagement member 15. The oblique portion 17 perpendicularly projects up from the engagement member 15 and includes an oblique surface relative to the moving direction of the expansion unit 2. The oblique contact surface 18 is provided as part of the engagement member 14. As shown in FIG. 4, the oblique portion 17 in the engagement member 15, which is a notched member that projects up from the engagement member 15, has one end close to both the expansion unit 2 and the computer side and the other end far from both the expansion unit 2 and the computer side or the insertion slot 33 of the expansion unit 2. The oblique portion 17 is inclined but approximately perpendicular to the moving direction of the expansion unit 2. The oblique contact surface 18 in contact with the oblique portion 17 (see FIG. 6) is an extended end of the side wall 92 that is bent perpendicular to the bottom side from the top plate member 91, and, as shown in FIG. 6, extends alone, an edge of a notch oblique along the moving direction of the expansion unit 2. These oblique portion 17 and oblique contact surface 18 (see FIG. 6) have approximately parallel contact surfaces, while chance the contact position. A change of the contact position controls a projection of the engagement projection 93 in the engagement member 15. Therefore, when the expansion unit 2 is inserted and loaded into the computer, the oblique portion 17 approaches the sidewall 92 of the oblique contact surface 18. As this portion of the oblique contact surface 18 is at a short distance to the expansion unit 2, the engagement projection 93 in the engagement member 15 can be retained when inserted into the lock groove 48 (as in FIGS. 4 and 8). In unlocking the expansion unit 2, an action of the pivotal piece 11 moves the frame member 14 along a sidewall of the expansion unit 2 to the side surface of the computer. As a result, the oblique portion 17 is spaced apart from the sidewall 92 of the oblique contact surface 18. As this portion of the oblique contact surface 18 is at a long distance to the expansion unit 2, the engagement member 15 rotates around the spindle (not shown) in the axial hole 94, and the engagement projection 93 in the engagement member 15 retreats from the lock groove 48. Thus, the lock device according to the present embodiment can unlock the expansion unit 2 in association with the frame member 14.

Figure 8:
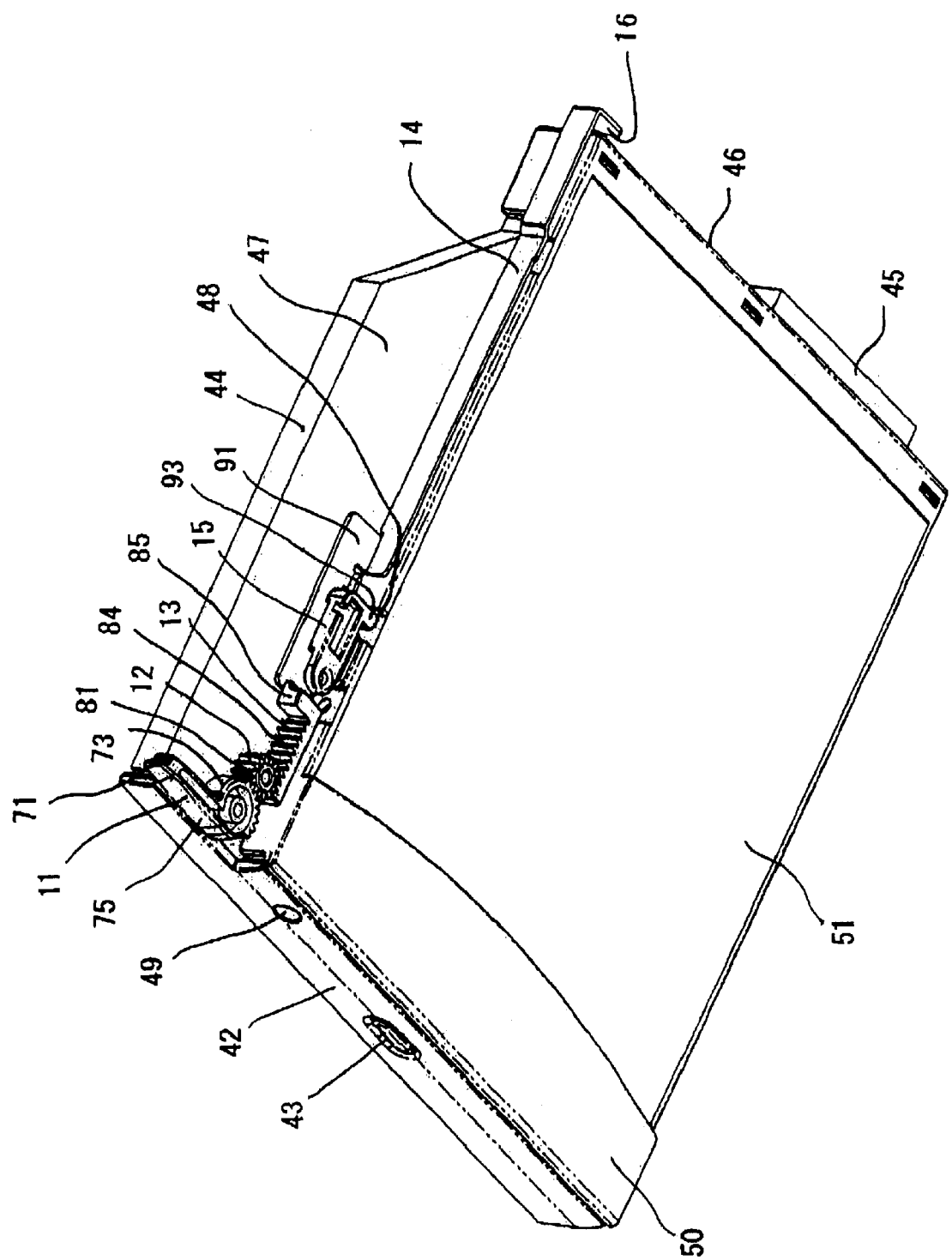
FIG. 8 is a perspective view for illustrating a relationship between the lock device of one embodiment according to the present invention and an expansion unit.

The lock device that may unlock and push out the expansion unit 2 simultaneously using the movement of, the frame member 14 is relatively small in its whole size, and may be stored under the thin portion of the expansion unit 2. As shown in FIG. 8, the expansion unit 2 has the thin portion 44 at its side and provides the pivotal piece 11 pinion gear 12, rack ear portion 13, frame member 14, engagement member 15, and press portion 16 of the present embodiment to maximize the space under this thin portion 44. These pivotal piece 11, pinion gear 12, rack gear portion 13, frame member 14, engagement member 15, and press portion 16 are thinner in the thickness direction of the computer body than the height under the thin portion 44. The present embodiment enables this range of action to simultaneously unlock and push out the expansion unit 2.

Figure 7:
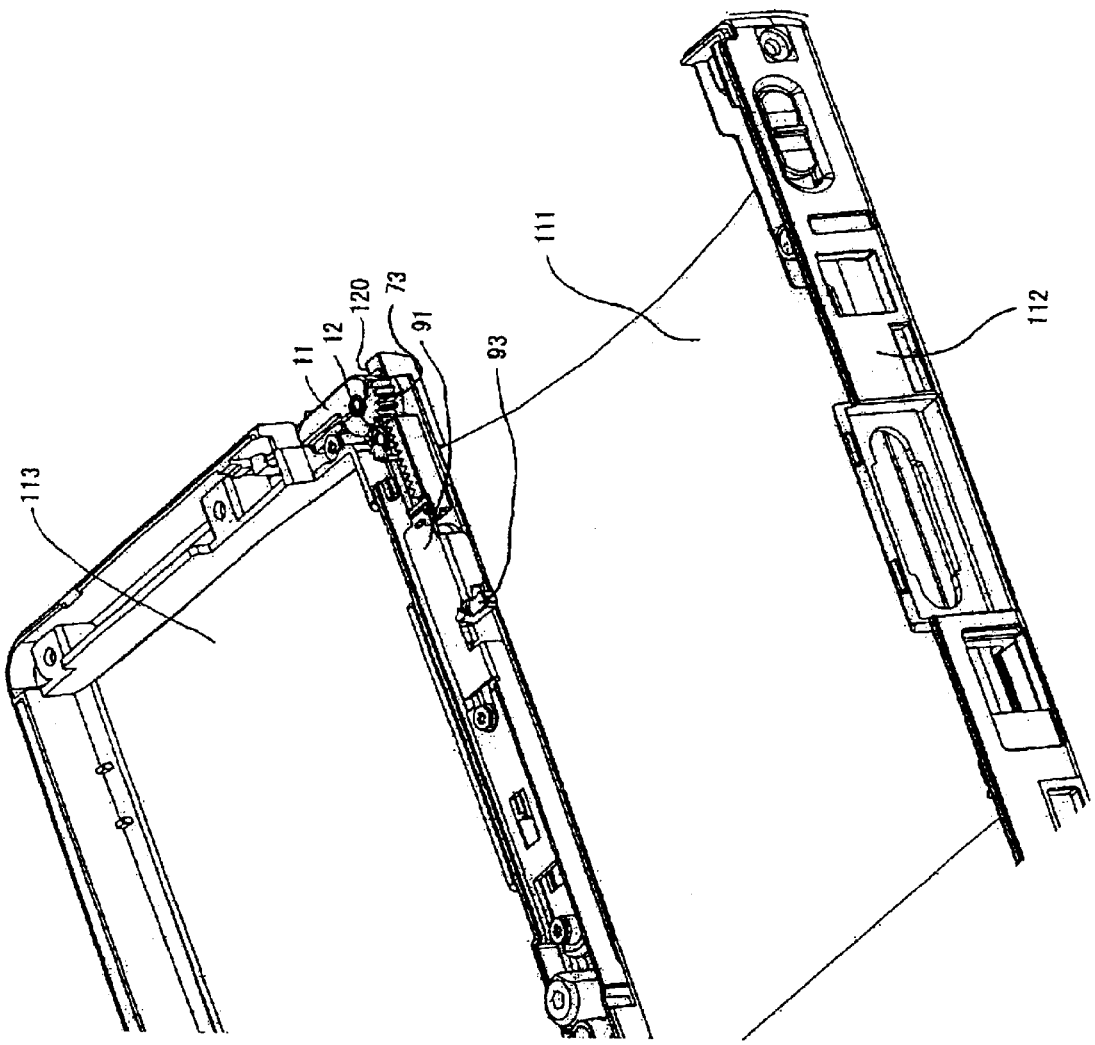
FIG. 7 is a perspective view of an arrangement of the lock device inside a computer of one embodiment according to the present invention.

FIG. 7 is a perspective view of the lock device when the expansion unit 2 is removed. A bottom plate 111 at expansion-unit insertion slot is so shaped as to form one common surface with the apron portion 50 of the expansion unit 2 when the expansion unit 2 is loaded. The bottom plate 111 includes an arc end fit for the arc end the apron portion 50 at the side of the insertion slot. This expansion-unit insertion slot extends near a bottom panel 112 of the computer body. There is an area 113 for accommodating a battery unit or the like at the side opposite to the lock device with respect to the expansion unit 2. The lock device including the pivotal piece 11, pinion gear 12, rack gear portion 13, frame member 14, engagement member 15, press portion 16, and others is provided in an elongated area between the area 113 and the bottom plate 111 at the expansion-unit insertion portion. In particular, the pivotal piece 11 that may move the frame member 14 is accommodated in the pivotal-piece storage portion 120 that is formed at the side of the computer. The pivotal piece 11 accommodated in the pivotal-piece storage portion 120 allows the arm portion 75 of the pivotal piece 11 to integrally form one common surface with the side of the computer when the pivotal piece 11 is unused, keeping a good appearance at this portion, and preventing unnecessary damages of the arm 75.

Figure 9:
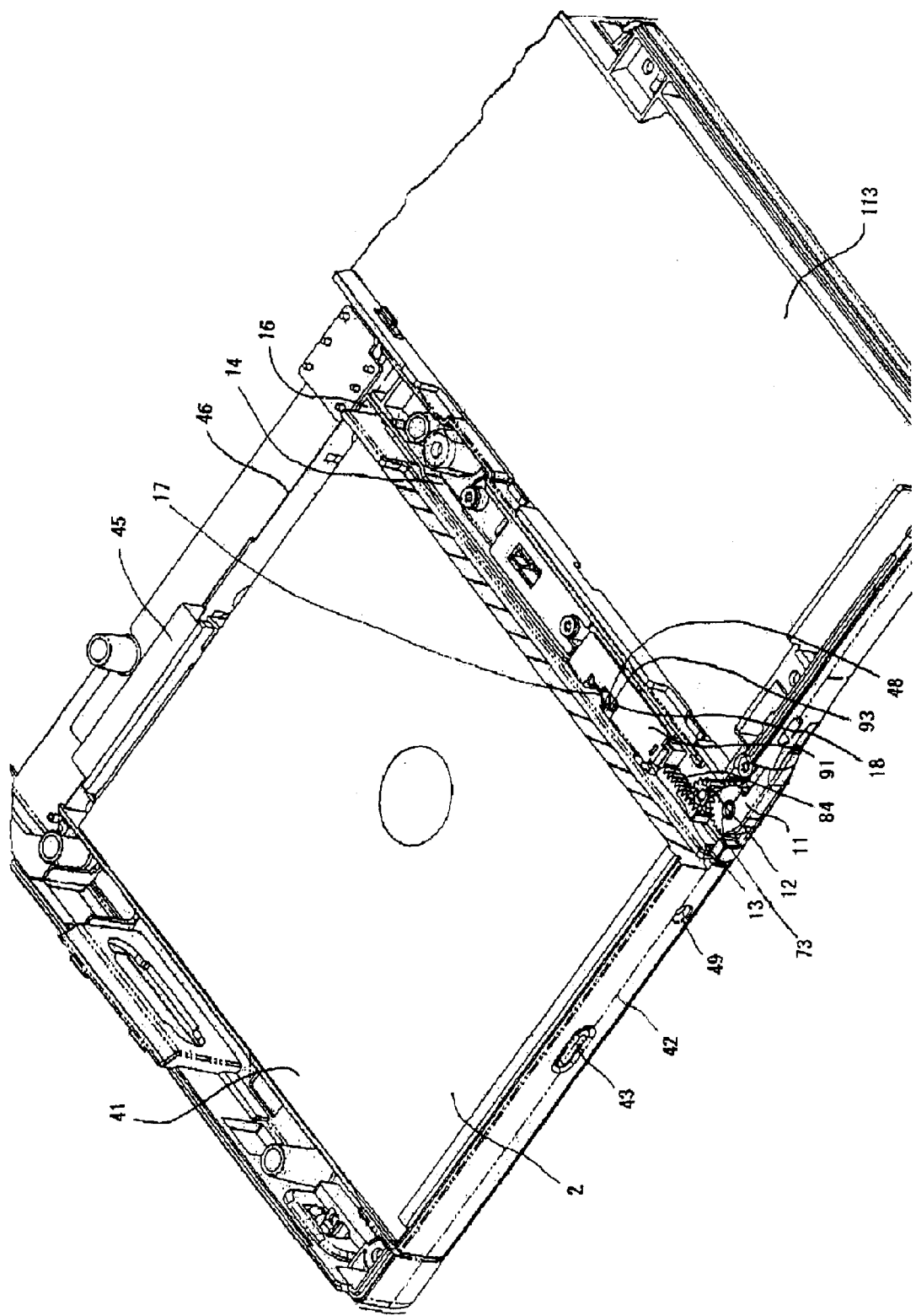
FIG. 9 is a perspective view showing actions of the lock device of one embodiment according to the present invention when the expansion unit is loaded.
Figure 10:
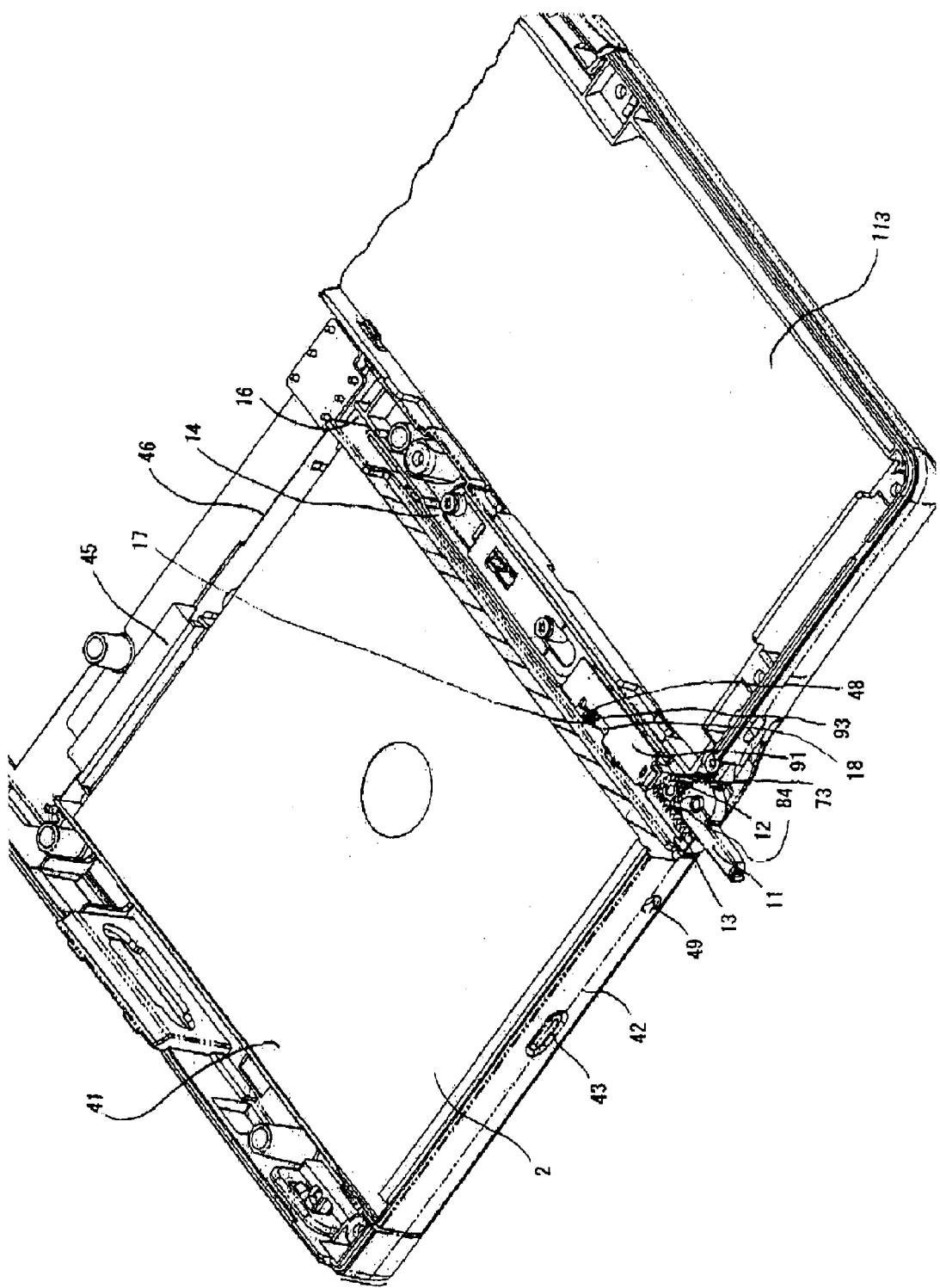
FIG. 10 is a perspective view showing actions of the lock device of one embodiment according to the present invention when the expansion unit is unlocked.
Figure 11:
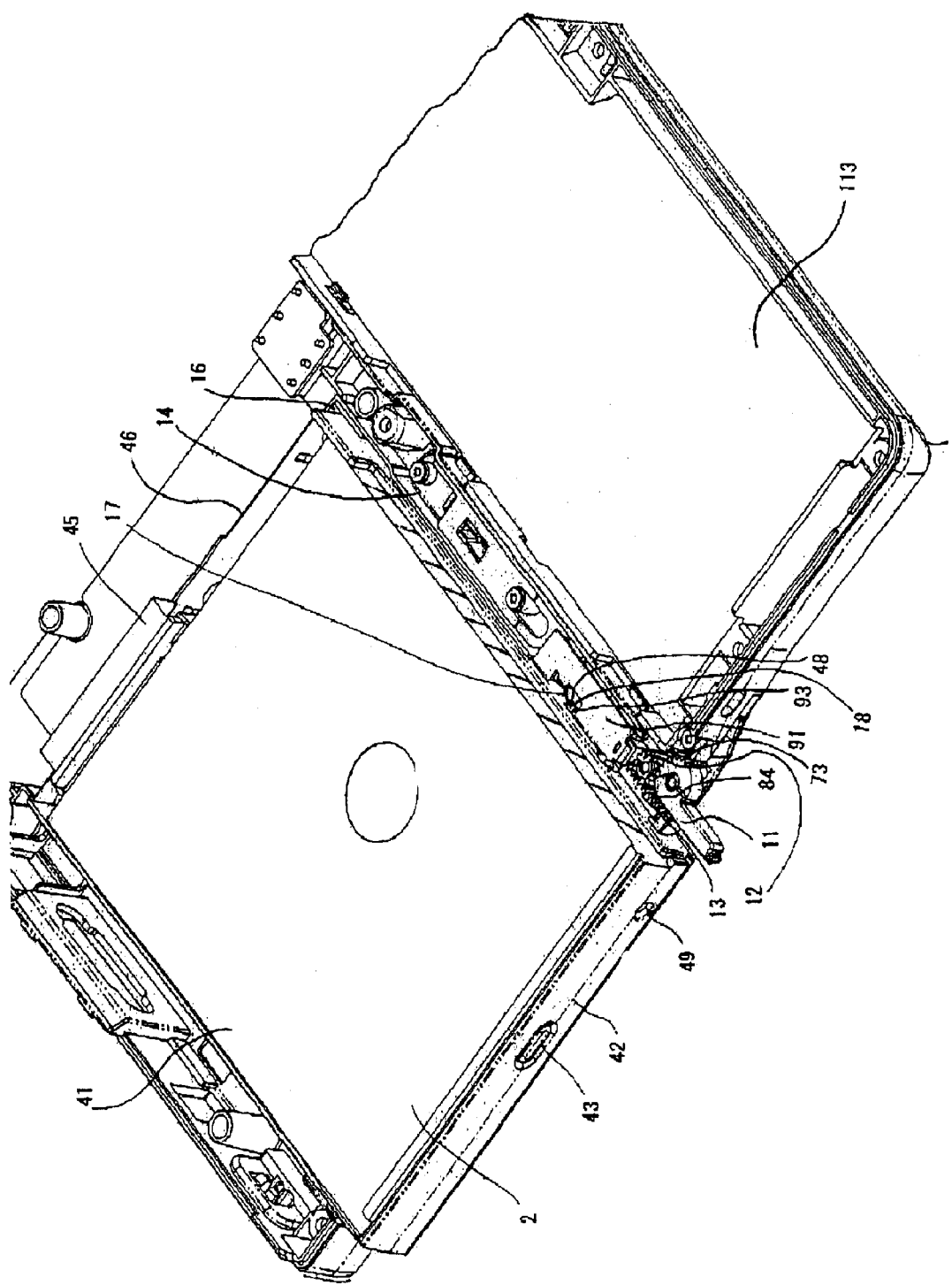
FIG. 11 is a perspective view showing actions of the lock device of one embodiment according to the present invention when the expansion unit is pushed out.
Figure 12:
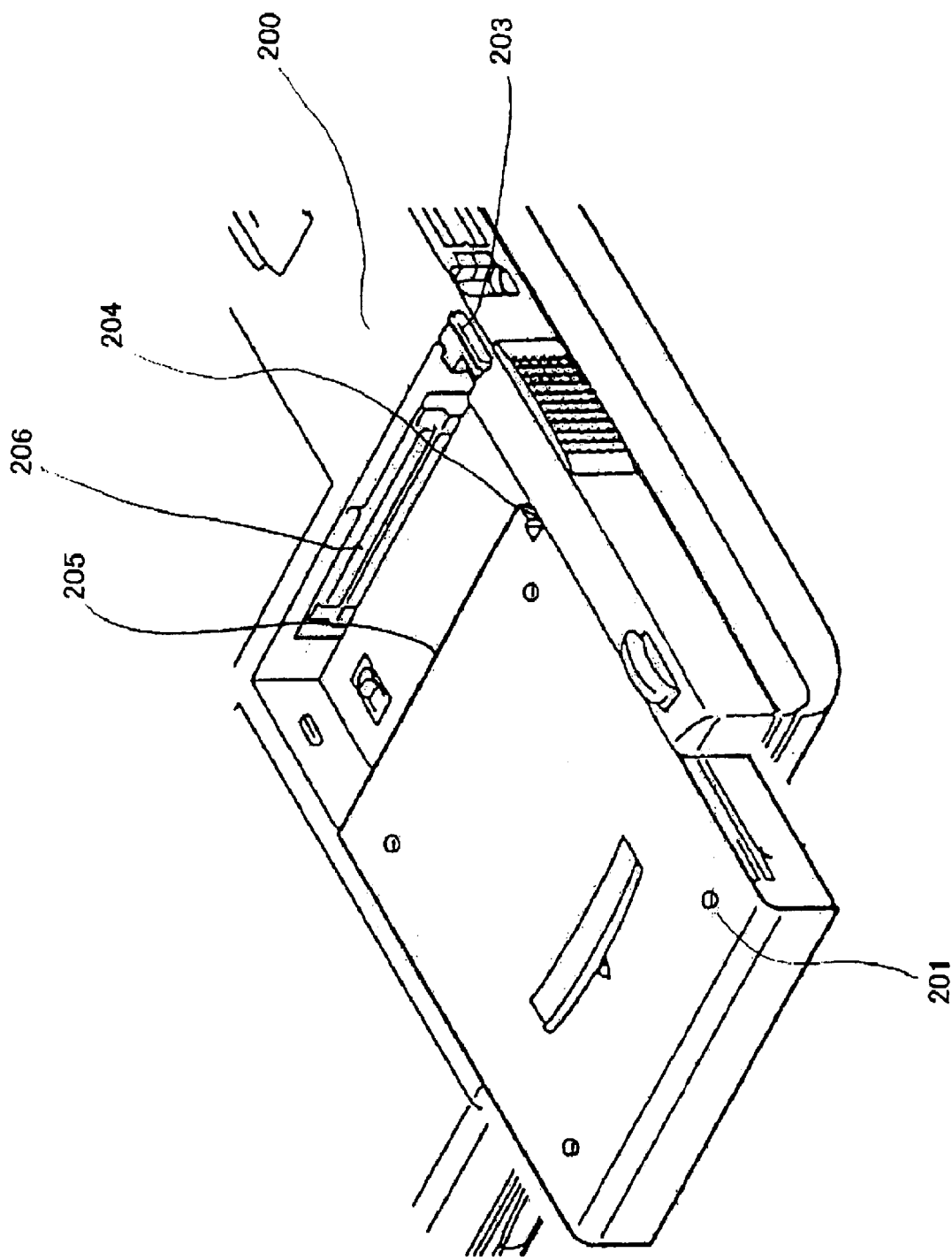
FIG. 12 is a perspective view showing an attachment structure of a conventional expansion unit.

Referring next to FIGS. 9 through 11, a description will be given of the operation of the lock device according to the present embodiment. In FIGS. 9 through 11, the thin portion 44 of the expansion unit 2 is cut away and thus not illustrated for description purposes.

FIG. 9 shows the expansion unit 2 loaded into the computer body. In this state, the pivotal piece 11 is accommodated in the pivotal-piece storage portion 120, and the arm 75 of the pivotal piece 11 integrally forms one common surface with the side of the computer. The gear portion 73 around the curved surface of the pivotal piece 11 meshes with the pinion gear 12, and the pinion gear 12 meshes with the rack gear portion 13 in the frame member 14. When the expansion unit 12 is to be loaded, the pinion gear 12 on the rack gear portion 13 is positioned at the side end of the computer.

The lock groove 48 in the expansion unit 2 engages the engagement projection 93 of the engagement member 15 when the expansion unit 2 is loaded. When the engagement projection 93 is inserted into the lock groove 48, the expansion unit 2 is fixed since it cannot move in its moving direction in the computer housing. Under such condition, the oblique portion 17 of the engagement member 15 is positioned close to the sidewall 92 of the oblique contact surface 18. As this portion of the oblique contact surface 18 is at a short distance to the expansion unit 2, the oblique portion 17 in contact with this oblique contact surface 18 is positioned close to the expansion unit 2 accordingly. Thus, the engagement projection 93 of the engagement member 15, which integrally forms one common surface with the oblique surface 17, is inserted into the groove 48, whereby the expansion unit 2 is locked and retained.

Next, as shown in FIG. 10, a user lifts up with a finger the projection portion 71 at the edge of the arm portion 75 of the pivotal piece 11. Then, the user holds and rotates the pivotal piece 11 using the linger around the rotary shalt 104 against the elastic force of the coil spring 101 in the pivotal piece 11. Then, the gear portion 73 rotates clockwise around the rotary shaft 104 of the pivotal piece 11 viewed from the top, and the pinion gear 12 engaged with the gear teeth portion 73 rotates counterclockwise. In the pivotal piece 11, the arm portion 75 extends in the circumferential direction of the rotary shaft 104, and its edge is thus easily rotatable by the lever action. It is particularly advantageous in case where the expansion unit 2 is heavy and the connection of the connector 45 at the rear surface of the expansion unit 2 is bad. The counterclockwise rotation of the pinion gear 12 moves the rack gear portion 13 integrally mounted to the frame member 14 straight parallel to the expansion-unit insertion slot 33. Therefore, the entire frame member 14 moves toward the side of the computer in accordance with the rotation of the pinion gear 14.

The movement of the frame member 14 changes the relative location between the oblique portion 17 and the oblique contact surface 18, whereby the oblique portion 17 and the oblique contact surface 18 are brought into contact at a side far from the sidewall 92, and the oblique contact surface 18 contacts the expansion unit 2 at a long distance. The engagement member 15 becomes rotatable around a spindle (not shown) without being restricted by the oblique contact surface 18. At the same time, the press portion 16 at the rear end of the frame member 14 pushes the rear corner of the expansion unlit 2 in the ejecting direction. Then, the connector 45 at the rear surface 46 of the expansion unit 2 is disengaged from the connector in the computer body. The expansion unit 2 is thus electrically released and moved toward the side of the computer by the pressing action of the press portion 16.

Then, the engagement projection 93 in the lock groove 48 contacts an inner wall of the lock groove 48, and retreats from and unlocks the expansion unit 2 as the engagement member 15 with the engagement projection 93 has already been rotatable.

FIG. 11 shows the expansion unit 2 being unlocked and then ejected from the insertion slot 33. In this embodiment, only the pivoting action of the pivotal piece 11 enables the press portion 16 to press and move the expansion unit 2 toward the side surface, and simultaneously the engagement projection 93 to be disengaged from the lock groove 48. Thereby, the expansion unit 2 can be easily and securely removed.

After the expansion unit 2 is ejected and a user completes the operation of the pivotal piece 11, the pivotal piece 11 returns to the original position, and is accommodated in the pivotal-piece storage portion 120. The arm portion 75 integrally forms one common surface with the side of the computer by the elastic force of the coil spring 101 that engages with the groove 76 at the rear surface of its arm portion 75. Thus, the elastic force automatically returns the pivotal piece 11 without requiring such a fingertip action as manually move the pivotal piece 11 back. This allows a user to concentrate on handling the expansion unit 2, and improves a user-friendliness of the computer.

Although the above embodiment uses the coil spring to return the pivotal piece 11 to the original position, it may use other mechanisms such as a mechanism returning to the original position by a leaf spring or by using the elasticity of in synthetic resin. Moreover, the oblique surface 17 in contact with the contact surface 18 may not have a plane shape but use any shape such as cylindrical, spherical, and square pillar-shape only if it moves in contact with the obliquely notched contact surface 18. In addition, a spring or any other member is usable for the mechanism for projecting the engagement projection 93 from the lock groove 4.

Further, the present invention is not limited to these preferred embodiments, but various variations and modifications may be made without departing from the spirit and scope of the present invention.

The present embodiment also discloses the following as illustrated in FIGS. 1 to 12 inclusive. The foregoing effects may be achieved by the following inventions.

This embodiment discloses a lock device for an expansion unit in a computer, the expansion unit being detachably attached to a computer body, the lock device serving to fix said expansion unit that realizes a predetermined extended capability when the expansion unit is connected to the computer body, the lock device comprising a pivotal piece near an expansion-unit insertion slot in said computer body, a first element, which extends along a moving direction of the expansion unit, moves in the extending direction by a pivoting action of the pivotal piece, and includes a press portion that presses the expansion unit when the expansion unit is to be released, and a second clement engageable with an engagement portion of the expansion unit, the second element being disengageable from the engagement portion when the first clement moves.

The second element may include an oblique portion obliquely provided relative to the extending direction, and the first element may include an oblique contact surface parallel to the oblique portion, the oblique portion being brought into contact with the contact surface in accordance with the first element's movement, whereby the second element is disengaged from the engagement portion of the expansion unit. The pivotal piece may be stored in a pivotal-piece storage portion provided at a side of the computer body when the pivotal piece is not operated. The pivotal piece may include a projection portion operable with a fingernail or fingertip at an edge portion of the pivotal piece. The pivotal piece may be engaged with a spring member and thereby pivot against an elastic force of said spring member, unlocking the lock device, and the pivotal piece is disengaged and stored into the pivotal-piece storage portion by the elastic force of the spring member.

The expansion unit may include a first portion on one side and a second portion on another side that is thicker than the first portion, and the pivotal piece, first and second elements may be so provided as to overlap the first portion in a direction of thickness. A pivotal-piece storage portion that stores said pivotal piece is provided on a side of the computer body and so positioned as to overlap the first portion of the expansion unit in the direction of thickness. The computer body is a portable information terminal.

This embodiment discloses a method of removing from a computer an expansion unit that has been detachably attached to a computer body, the expansion unit capable of realizing a predetermined extended capability when the expansion unit is connected with the computer body, the method comprising the steps of moving in a moving direction of the expansion unit, by pivoting a pivotal piece, a first element that extends along the moving direction, pressing the expansion unit using a press portion provided on the first element, and disengaging an engagement member provided on the first element from an engagement portion of the expansion unit, and making the expansion unit detachable from the computer body. The moving step may be carried out by converting the pivoting action of the pivotal piece into a linear operation by a pinion gear and rack. The engagement member may include an obliquely portion that is obliquely provided relative to the moving direction of the expansion unit, and the first element may include an oblique contact portion that is parallel to the oblique portion of said engagement member. The pressing step may disengage the engagement member provided on the first element from the engagement portion of the expansion unit as the first element moves as a result of a contact between the oblique portion of the engagement member and the oblique contact portion of the first element.

What is claimed is:

1. A lock device of an expansion unit in a computer, said lock device serving to fix said expansion unit, so as to provide a predetermined extended capability when said expansion unit is connected to a computer body, said lock device comprising:

a pivotal piece located near an expansion-unit insertion slot in said computer body;

a first element, which extends along a moving direction of said expansion unit, which moves in an extending direction by a pivoting action of said pivotal piece, and includes a press portion that presses said expansion unit when said expansion unit is to be released; and a second element engageable with an engagement portion of said expansion unit, said second element being disengageable from said engagement portion when said first element moves.

2. A lock device according to claim 1, wherein said second element includes an oblique portion obliquely provided relative to said extending direction, and said first element includes an oblique contact surface parallel to said oblique portion, said oblique portion being brought into contact with said contact surface in accordance with said first element's movement, whereby said second element is disengaged from said engagement portion of said expansion unit.

3. A lock device according to claim 1, wherein said pivotal piece is stored in a pivotal-piece storage portion provided at a side of said computer body when said pivotal piece is not operated.

4. A lock device according to claim 3, wherein said pivotal piece is engaged with a spring member and thereby pivots against an elastic force of said spring member, unlocking said lock device, and said pivotal piece is disengaged and stored into said pivotal-piece storage portion by said elastic force of said spring member.

5. A lock device according to claim 1, wherein said pivotal piece includes a projection portion operable with a fingernail or fingertip at an edge portion of said pivotal piece.

6. A lock device according to claim 1, wherein said expansion unit includes a first portion on one side and a second portion on another side that is thicker than the first portion, and said pivotal piece, first and second elements are so provided as to overlap said first portion in a direction of thickness.

7. A lock device according to claim 6, wherein a pivotal-piece storage portion that stores said pivotal piece is provided on a side of said computer body and so positioned as to overlap said first portion of said expansion unit in the direction of thickness.

8. A lock device according to claim 1, wherein said computer body is a portable information terminal.

9. A method of removing from a computer an expansion unit that has been detachably attached to a computer body, said expansion unit capable of realizing a predetermined extended capability when said expansion unit is connected with said computer body, said method comprising the steps of:

moving in a moving direction of said expansion unit, by pivoting a pivotal piece, a first element that extends along the moving direction;

pressing said expansion unit using a press portion provided on said first element, and disengaging an engagement member provided on said first element from an engagement portion of said expansion unit; and detaching said expansion unit from said computer body.

10. A method according to claim 9, wherein said moving step is carried out by converting said pivoting action of said pivotal piece into a linear operation by a pinion gear and rack.

11. A method according to claim 9, wherein said engagement member includes an oblique portion that is obliquely provided relative to the moving direction of said expansion unit, and said first element includes an oblique contact portion that is parallel to the oblique portion of said engagement member, and wherein said pressing step disengages the engagement member provided on said first clement from the engagement portion of said expansion unit as the first element moves as a result of a contact between the oblique portion of said engagement member and the oblique contact portion of the first element.

* * * * *